Feb. 26, 1963   R. O. PETERSON   3,078,624
ROTARY ABRADING TOOL
Filed July 25, 1958   4 Sheets-Sheet 1

INVENTOR.
RUBEN O. PETERSON
BY
Oberlin & Limbach
ATTORNEYS

Feb. 26, 1963   R. O. PETERSON   3,078,624
ROTARY ABRADING TOOL
Filed July 25, 1958                                   4 Sheets-Sheet 2

INVENTOR.
RUBEN O. PETERSON
BY
*Oberlin & Limbach*
ATTORNEYS

Feb. 26, 1963 R. O. PETERSON 3,078,624
ROTARY ABRADING TOOL
Filed July 25, 1958 4 Sheets-Sheet 3
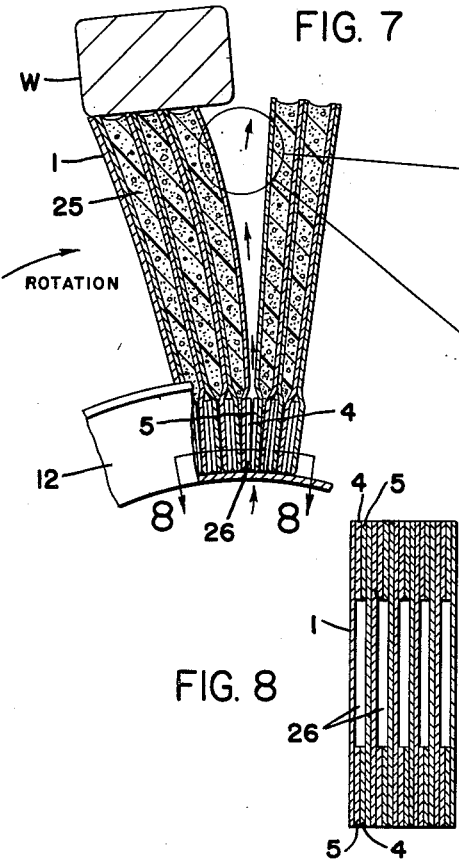
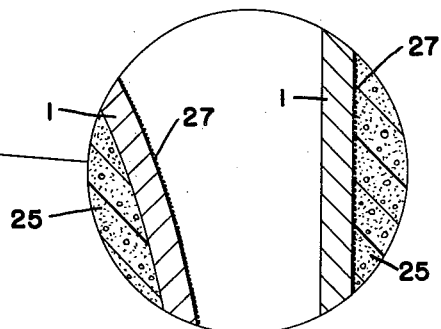
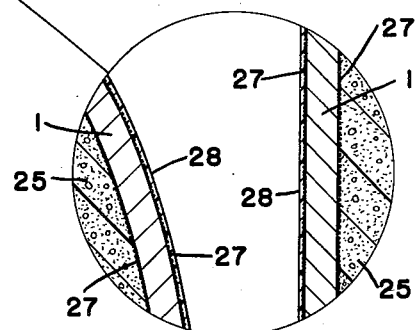
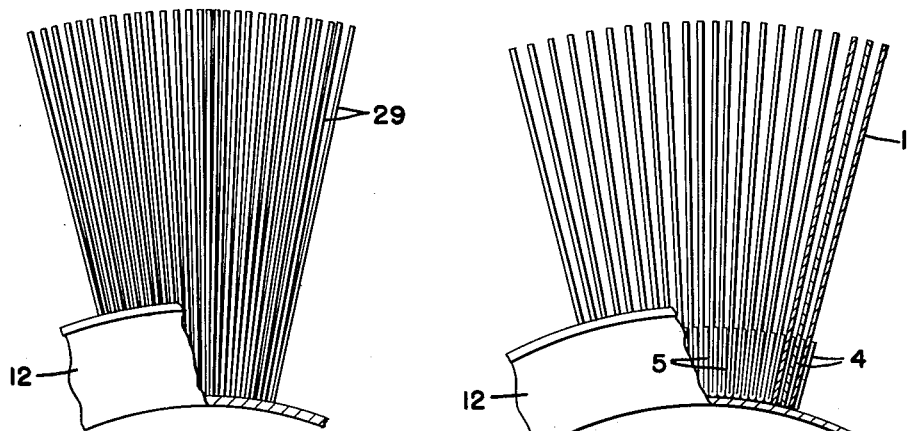
INVENTOR.
RUBEN O. PETERSON
BY
Oberlin & Limbach
ATTORNEYS Feb. 26, 1963  R. O. PETERSON  3,078,624
ROTARY ABRADING TOOL
Filed July 25, 1958  4 Sheets-Sheet 4

INVENTOR.
RUBEN O. PETERSON
BY
*Oberlin & Limbach*
ATTORNEYS

United States Patent Office 3,078,624
Patented Feb. 26, 1963

3,078,624
ROTARY ABRADING TOOL
Ruben O. Peterson, University Heights, Ohio, assignor to The Osborn Manufacturing Company, Cleveland, Ohio, a corporation of Ohio
Filed July 25, 1958, Ser. No. 750,958
21 Claims. (Cl. 51—193.5)

This invention relates as indicated to a novel rotary abrading tool, and more particularly to a tool in the nature of a power driven rotary brush.

For the performance of certain types of brushing operations and more especially when granular abrasive is to be applied to the work in a surface finishng operation, it is sometimes advantageous to employ rotary tools provided with radially outwardly extending flaps capable of yielding somewhat when encountering the work and of carrying the granular abrasive in an effective manner for application to the work. It is an object of the present invention to provide a tool of this general type in which the flaps or leaves are formed and mounted in a manner to minimize the objections which have been made to this type of tool in the past.

Another object is to provide a method of assembling a rotary tool of this type which will be suitable for relatively large scale production and will result in a uniform product.

A further object is to provide a rotary tool of the flap type, wherein such flaps may be metal sheets, for example, with interposed layers of resiliently deformable elastomeric material effective to improve the action of the tool in engagement with the work as well as to increase the life of the tool.

Still another object is to provide a novel arrangement of the brushing leaves which will facilitate cooling ventilation of the tool in use.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 7 is a fragmentary view of an enlarged scale of a portion of the finished tool illustrating semi-diagrammatically the manner in which my new tool operates in engagement with the work;

FIG. 8 is a section taken on the line 8—8 to show the ventilating passages provided;

FIGS. 9 and 10 illustrate a portion of FIG. 7 on a much enlarged scale modified to show granular abrasive bonded to the flaps or leaves;

FIG. 11 shows a relatively simple flap type rotary tool in accordance with my invention without the provision of the interposed elastomeric material or special ventilating feature;

Figure 1:
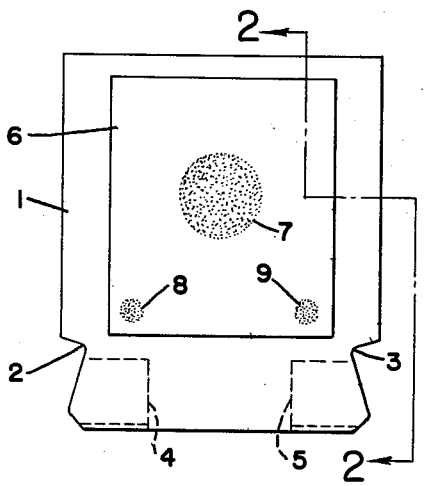
FIG. 1 is a plan view of an individual flap or leaf, in this case of sheet metal, suitable for employment in the manufacture of one embodiment of my invention, and having a smaller layer of uncured elastomeric material bonded thereto adapted to be blown or foamed and cured by the application of heat at a later stage in the manufacture.
Figure 13:
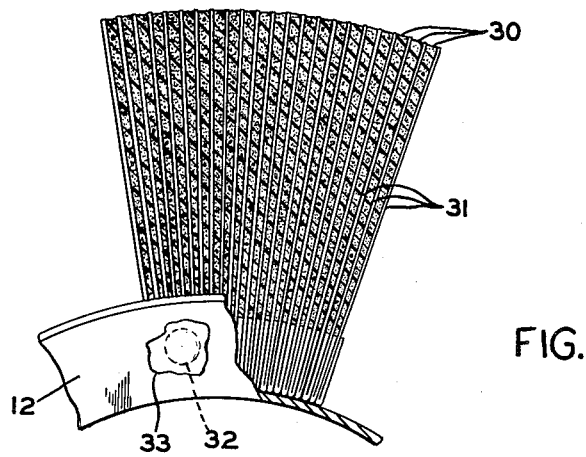
Figure 14:
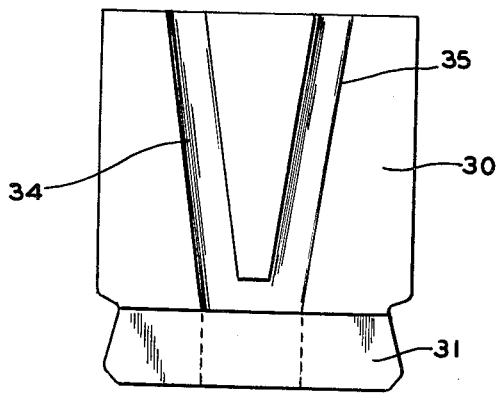
Figure 15:
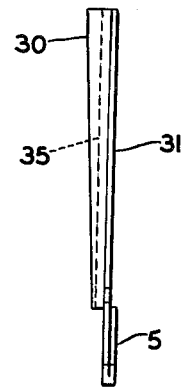

FIG. 12 similarly shows a tool in accordance with my invention without the interposed elastomeric material, but with turned up tabs at the inner ends of the flaps to space the latter to provide ventilating passages such as those shown in FIG. 8;

FIG. 13 is a view similar to FIG. 7 but with elastomeric material interposed between all of the flaps;

FIG. 14 is a plan view of a flap similar to FIG. 1, but with a layer of elastomeric material molded and cured thereto; and FIG. 15 is a side edge view of FIG. 14.

Figure 2:
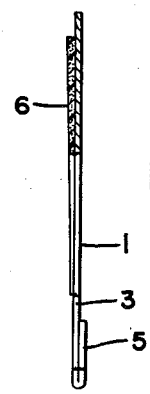
FIG. 2 is an edgewise view partly in section taken on the line 2—2 on FIG. 1.
Figure 3:
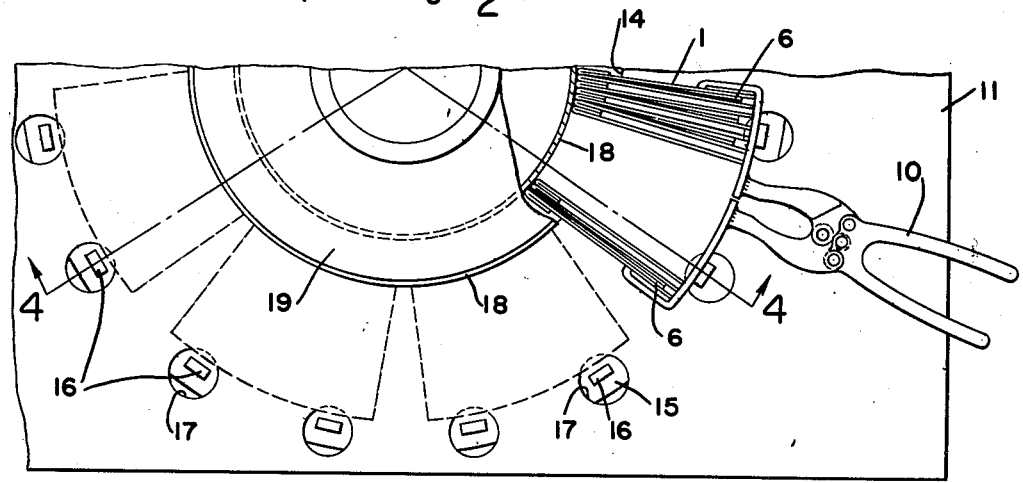
FIG. 3 is a top plan view partly broken away illustrating the manner in which the component parts of a tool embodying the principles of my invention may be assembled.
Figure 4:
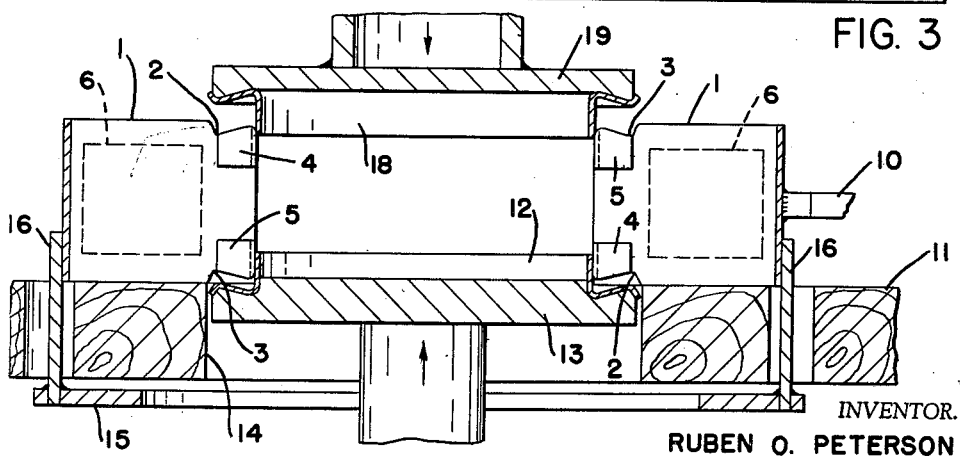
FIG. 4 is a vertical transverse section through the assembly and associated mechanism of FIG. 3 taken on the line 4—4 on FIG. 3.

Referring now to such drawing and especially FIGS. 1–6 thereof, the manufacture of a typical rotary abrading tool embodying the principles of my invention will first be described by way of illustration. A large number of thin sheet metal flaps or leaves 1 of general rectangular shape are cut out provided with pairs of notches 2 and 3 in their opposite side edges adjacent one end thereof. The adjacent corner portions of the flap are reinforced by folding back spaced tabs 4 and 5 which serve an additional purpose explained below. To the surface of the flap opposite the side on which such flaps are folded, a rectangular layer of uncured elastomeric material 6 is adhered by means of an adhesive or bonding agent in regions such as 7, 8 and 9. As best shown in FIG. 2, the layer of elastomeric material 6 will desirably be of gradually increasing thickness as it approaches the edge of flap 1 farthest removed from the edge where such tabs 4 and 5 are folded back, and such elastomeric material 6 will preferably be of smaller dimensions than flap 1 so that it does not extend to the respective edges of the latter (see FIG. 1). Such layer 6 may conveniently be cut from a long ribbon of elastomeric material which has been formed as by rolling or pressing to the tapering cross-section indicated.

A number of the preformed flap assemblies above described may be assembled in a group or stack which may amount to some predetermined portion of the circumference of a wheel, for example one-eighth, and clipped together by means of a tong 10 for convenient handling and placement upon table 11. Successive flaps will be thus assembled in pairs with their turned up tabs opposed and with their elastomer coated surfaces opposed alternately. The lower inner edges of the flaps engage the cylindrical surface of an annular sheet metal hub member 12 supported on a vertically reciprocable die head 13 in opening 14 in the table. A ring 15 provided with a plurality of vertically upwardly projecting index fingers 16 is likewise mounted for vertical reciprocation with such fingers extending through apertures such as 17 in the table temporarily to position the stacks of flaps 1 resting thereon. When the series of stacks of flaps, in this case eight, forming the segments of the wheel are all assembled around the die or boss 13 and the hub member (face plate) 12, a second complementary hub member 18 is positioned to engage the upper side of the flap assembly, and die member 13 and/or die member 19 is reciprocated to squeeze hub members 12 and 18 into position interfitting notches 2 and 3 respectively.

Figure 5:
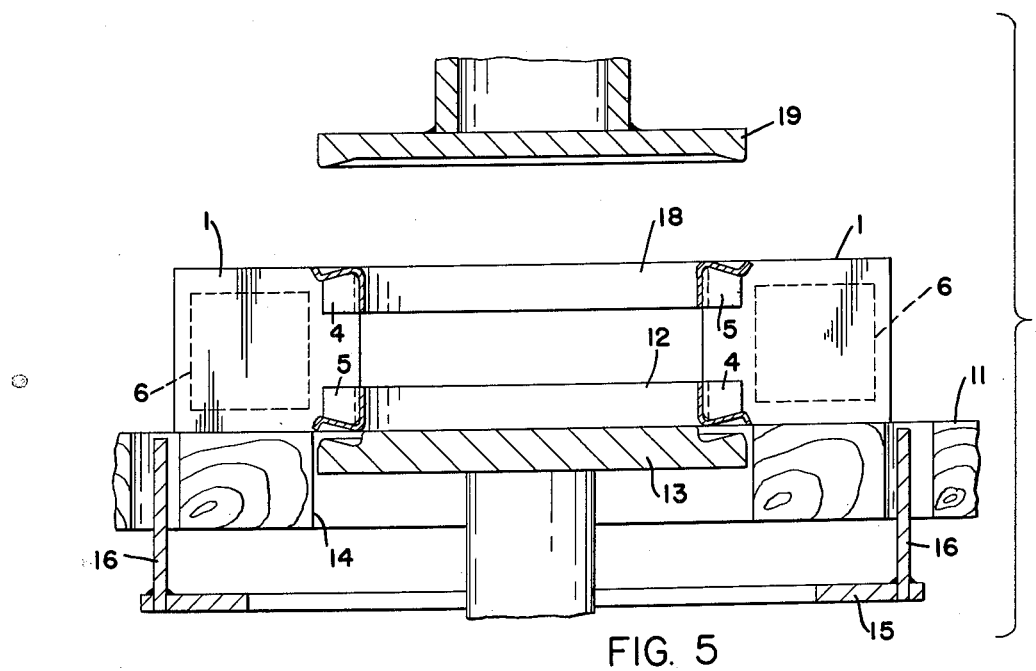
FIG. 5 is a vertical section corresponding to FIG. 4 but showing a later step in the manufacture.
Figure 6:
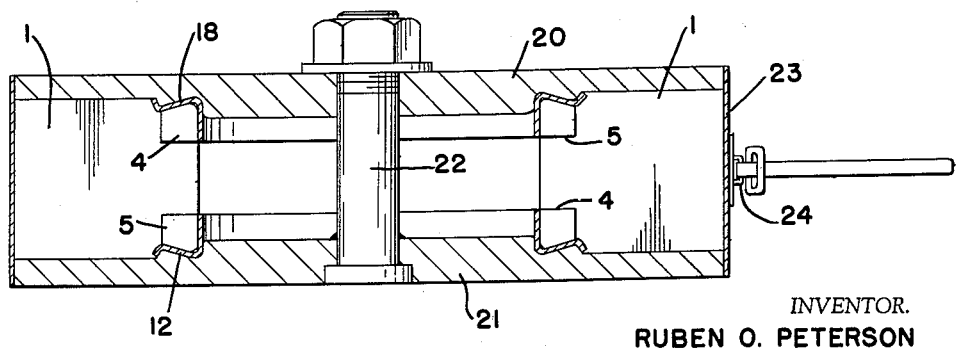
FIG. 6 shows the assembled rotary tool of FIG. 5 placed in an appropriate mold for blowing and curing of the incorporated elastomeric material.

As shown in FIG. 5, the clamping tongs 10 may then be removed, ring 15 with fingers 16 lowered to retract the latter below the top of table 11, die 19 elevated out of engagement with the tool assembly and die 13 lowered below the level of the table top so that the tool assembly may now be slid to one side on the table to another station. The tool thus assembled may now be placed in a suitable mold comprising two circular side face members 20 and 21 which closely fit and conform to the sides of such tool assembly. These two mold members may be bolted together by means of central bolt 22 and the outer periphery of the assembly closely enclosed by a sheet metal strip 23 drawn down tightly thereon and secured by means of a strap latch 24.

When the mold has thus been closed, it may be placed in an oven and brought up to the proper temperature to soften the elastomeric material and to activate a blowing compound contained in the latter effective to expand and force the elastomeric material to penetrate all spaces available to it. The heating is continued until the sponged elastomeric material has been cured in the usual manner. It will now be appreciated that the original layers of elastomeric material 6 are of greater thickness adjacent the outer periphery of the tool assembly inasmuch as the spaces to be filled are naturally greater in this region when the flaps are arranged in radial fashion.

A rotary tool is thus produced comprising an inner hub with a plurality of radially extending sheet metal leaves or flaps lying in planes parallel to and including the axis of the tool, pairs of such flaps being in face-to-face contact and separated from adjacent pairs of flaps by the expanded foamed elastomeric material. While the outer peripheral surface of the particular tool above described is cylindrical, it will, of course, be obvious that such surface may follow a conical or other contour as desired, depending upon the use to which it is to be put.

Now referring more particularly to FIGS. 7-10 of the drawing, these figures illustrate certain features of the invention in a somewhat diagrammatic manner and more especially illustrate the manner of operation of the tool. When the tool engages a work-piece such as W the flaps will flex somewhat in the manner shown, being resiliently supported by the foamed elastomeric material 25 filling the spaces between adjacent pairs of flaps and the contacting faces of each pair of flaps will successively be spaced apart much as when ruffling a deck of cards. When this occurs, ventilating air is enabled to flow radially outwardly from the interior of the tool through passages 26 afforded between the flaps of each pair by the spacing of their radially inner end portions produced by tabs 4 and 5 (FIG. 8), thereby both cooling the tool and preventing the accumulation of excessive abrasive and other debris between the flaps where it would cause generation of heat and undue wear.

In magnified view 9, the flaps 1 are shown provided with coatings of granular abrasive 27 thereon adapted to be applied to the work by the tool in use. Of course, it is only the abrasive adjacent the outer ends of the flaps which is thus applied as the tool gradually wears down in use. In FIG. 9, the abrasive is thus applied to one surface only of each flap on a side to be effective when the tool is rotated in a clockwise direction as shown in FIG. 7. The abrasive 27 may, however, desirably be applied to both surfaces of each flap (FIG. 10), and the layers of abrasive adhered to the opposed surfaces of each pair of flaps may desirably be coated with a thin coating 28 of plastic or resin which not only assists in bonding the abrasive grains to the flaps but prevents deleterious rubbing of the two abrasive coated surfaces together. It is usually preferred that the abrasive grains be oriented so that their sharp points extend lengthwise of the flap in a radially outward direction.

A rotary tool of the general type above described may also be produced by first assembling a plurality of sheet metal flaps or leaves 29 of the same general configuration as flaps 1 but without the applied elastomeric material to form a rotary tool as indicated in FIG. 11 in which the inner ends of the flaps are packed closely together where clamped by the hub elements and the flaps extend radially outwardly in planes parallel to the axis of rotation of the tool. While a tool of this type is itself useful for many purposes, it may generally be much improved by the intrusion of elastomeric material between the flaps (as by rotating the tool and successively spreading the flaps apart while spraying the uncured elastomeric material therebetween) and thereafter curing in a mold such as that shown in FIG. 6 to foam, expand and cure the elastomeric material. Abrasive may likewise be applied to the flaps in the manner explained above.

As shown in FIG. 12, the sheet metal flaps 1, without elastomeric material adhered thereto, may be assembled by clamping between opposed hub members 12 and 18 with the turned up tabs 4 and 5 all facing in the same direction. In this arrangement, the sheet metal flaps 1 are all uniformly spaced rather than being arranged in pairs and the tool may be employed in this condition with a consequent advantageous ventilating effect as compared to the FIG. 11 embodiment. Likewise, however, suitable elastomeric material may be intruded between the flaps in the manner described above to provide a tool in which the sheet metal flaps are resiliently supported, thereby both favorably modifying their action in use and also much prolonging their life.

The elastomeric material 6 may desirably be compositions based on plyurethane resin, silicone rubber, or polychloroprene (Neoprene) containing an appropriate blowing compound effective to produce a multitude of small gas pockets throughout the material upon heating. Such gas pockets constitute a very large portion of the elastomeric body when the latter has been blown and cured and the walls of the gas pockets are thin, not only facilitating a considerable degree of relative movement of the flaps in use but also ensuring that the elastomeric material will be eroded away in use more rapidly than such flaps. Consequently, the flaps will always project somewhat radially outwardly beyond the elastomeric material to expose the abrasive on the flaps. Granular or powdered abrasives may also be included in the elastomeric material itself to be supplied to the working face of the tool as the elastomer erodes away. Such granular abrasives includes aluminum oxide, silicon carbide, emery, sand, pumice, etc. While the flaps may be of metal, including very hard metals such as Hadfiield steel, they may also be of paper, textile fabrics, and certain plastic sheet materials depending on the purpose for which the tool is to be employed.

In addition to clamping the flaps between the end plates or hub members 12 and 18, the flaps may be further secured thereto by means of an appropriate adhesive such as an epoxy resin composition. Instead of or in addition to the use of adhesive initially to secure the elastomeric material 6 to the flaps, the latter may be perforated, preferably in the areas 8 and 9 as shown in FIG. 1 for entrance of elastomeric material into the insulating apertures. In some cases, the elastomeric material is sufficiently sticky that no such apertures or supplemental adhesive are required to ensure proper bonding of the elastomeric material to the flaps. It will be noted that the hub members or clamping end plates 12 and 18 conform to the inner end portions of the flaps in such manner that they do not project axially beyond the latter. This is of importance when it is desired to assemble a plurality of my new abrading tools in close axial side-by-side relation to form a longer cylindrical tool without interruption of the working surface thereof.

While the elastomeric material may be provided between all successive flaps of the tool, it will ordinarily be preferred to sandwich such elastomeric material between successive pairs of flaps as best illustrated in FIG. 7 so that provision may be made for ventilation of the tool in use while nevertheless maintaining a relatively continuous working face. This arrangement also enhances the abrading action of the tool which has more of the characteristics normally associated with power driven rotary brushes. The rapid rotation of the tool is effective to draw air or other fluid coolant from the open central portion of the tool radially outwardly between the flaps but, of course, such action may be supplemented by provision of a blower or equivalent means adapted to deliver the coolant under pressure to the interior of the tool.

The end plates such as 12 and 18 may have a few perforations which will permit elastomeric material, while it is being cured in the mold (FIG. 6), to ooze outwardly and assist in securing such end plates to the body of flaps and sponge elastomeric material, supplementing the natural adhesiveness of the latter or of the epoxy resin composition adhesive which may be employed.

A variety of different abrasive bearing sheet materials may be utilized for the flaps, including textile fabrics having open screen-like weaves of strong threads such as acetate and nylon materials. In view of the many interstices provided by such materials, a very large quantity of granular abrasive may be secured thereto. The elastomeric material of the "sandwiches" (FIGS. 7, 9 and 10) then assists in holding the abrasive particles in the flap materials. The flaps should ordinarily be of strong materials capable of withstanding high centrifugal forces when the tool is rotated at high operating speeds and a coarse screen-like fabric having very strong radially extending threads (as in tire cord fabric) may be employed. Another sheet material having great tear strength is Mylar plastic which may be perforated to provide sufficient holes for the elastomeric material to pass through during the curing operation, with abrasive being bonded to the exposed surface of the sheet.

A typical example of a plastic composition suitable for employment to produce the resiliently deformable foamed elastomer interposed between the flaps, upon heating and curing, is as follows:

| | Percent by wt. |
|---|---|
| Neoprene (polychloroprene) | 51.94 |
| Zinc oxide | 2.60 |
| ELC magnesia | 2.08 |
| Sodium acetate (retarder) | .26 |
| Unicel N.D. (blowing agent) (N-N dinitrosopentamethylenetetramine | 1.56 |
| Mapico red (coloring material) | .52 |
| Zeolex (filler) (silicon dioxide) | 16.62 |
| Paraffin (lubricant) | .52 |
| Circo Lite Foil (plasticizer) (aliphatic mineral oil) | 23.38 |
| Thermoflex A (anti-oxidant) (composed of 50% N-phenyl beta naphthylamine, 25% N-N diphenylparaphenylenediamine, and 25% 4-4 dimethoxydiphenylamine) | .52 |
| | 100.00 |

It will be seen from the foregoing that I have provided a novel abrading or polishing wheel which is adapted to be cooled in action by the flow therethrough of a fluid coolant such as air, such tool comprising a circular pack of flaps or leaves having an inner end portion dovetailed to fit appropriate hub elements or clamping members. Such flaps may desirably have an abrasive surface and the spaces between alternate flaps may be filled with an elastomeric sponge material. This latter material, of course, additionally serves to cushion the flaps upon impact with the work and to reduce destructive vibration.

One form of sheet material suitable for use as the flaps or leaves in my new tool may be made of strong felted fibers such as those commercially known as Dacron, the fibers having been wet with an epoxy resin composition and preferably a long chain amine, the portions which are to form the outer or working end portions of the flaps being loaded with granular abrasive dispersed through the thickness of the felted fiber sheet. The whole is pressed and heated at least partially to cure the epoxy resin composition, thereby binding the fibers together into a strong sheet and securing the granular abrasive to the fibers. The outer working portions of these flaps may be of any desired shape or contour depending on the type of operation for which the tool is to be employed.

The FIG. 13 embodiment is similar to that of FIG. 12 except that elastomeric material 30 is interposed between all of the flaps 31. Such elastomeric material will preferably be a sponged elastomer such as a sponge Neoprene composition, above described, bonded to the flaps and allowed to protrude slightly through a plurality of holes 32 in the sides 12 of the hub and to spread out slightly as at 33 to assist in securing the assembly together. As will appear from FIGS. 14 and 15, the sponge elastomeric material 30 may be in the form of wedge shaped bodies bonded to one or both sides of the flaps 31 and formed with grooves such as 34 and 35 molded in their other faces to extend radially of the rotary tool and assist in ventilation and cooling. Such elastomeric material preferably does not extend entirely to the inner ends of the flaps.

The flaps may, if desired, be of extremely hard material such as Hadfield Steel (an austenitic steel containing approximately 14% manganese) as well as various spring metal stocks. The metal flaps may have a Knoop hardness in excess of 600 and even 700 and still be suitable for use as they are protected and vibration is damped by the interposed elastomeric material. Other relatively hard materials such as hard wire and glass fibers may be bonded to such flaps or fingers or to flaps formed of buffing fabrics, sisal, and hemp so that they extend in a direction radially of the tool. These are likewise protected by the sponge elastomeric material except at their extreme outer ends, and may be embedded in such material.

Other modes of applying the principle of the invention may be employed, change being made as regards the details described, provided the features stated in any of the following claims or the equivalent of such be employed.

I therefore particularly point out and distinctly claim as my invention:

1. A rotary abrading tool having a large number of sheet material flaps assembled in radial planes substantially parallel to the axis of rotation of the tool, a pair of annular end plates together dovetailed to the radially inner ends of said flaps and bonded thereto, the axially outer edge of each end plate lying in the same plane transversely of such axis of rotation as the corresponding edges of said flaps so that a plurality of said tools can be mounted co-axially in close side-by-side relation without leaving gaps in the working faces of the resultant assembly or causing the flaps of adjacent tools to overlap, a sponge elastomeric composition interposed between successive pairs of said flaps and bonded thereto, tabs on the inner end portions of said flaps turned in adjacent the respective inner corners of the latter and leaving a space therebetween, said tabs being on the sides of said flaps directly opposed to adjacent flaps without said elastomeric composition therebetween to afford radial passages for outward flow of cooling fluid when the tool is in operation, abrasive coatings bonded to surfaces of said flaps, and thin protective plastic coatings over said abrasive on the sides of said flaps not bonded to said elastomeric composition, said elastomeric composition entering into apertures in said annular end plates further to assist in joining the assembly together.

2. A rotary abrading tool having a large number of sheet material flaps assembled in radial planes substantially parallel to the axis of rotation of the tool, a pair of annular end plates together dovetailed to the radially inner ends of said flaps and bonded thereto, a sponge elastomeric composition interposed between successive pairs of said flaps and bonded thereto, and spacer means between the inner end portions of said flaps on the sides of said flaps directly opposed to adjacent flaps without said elastomeric composition therebetween providing radial passages for outward flow of cooling fluid when the tool is in operation.

3. The tool of claim 2, wherein said flaps are metal.

4. The tool of claim 2, wherein said flaps are fabric.

5. The tool of claim 2, wherein abrasive is secured to the flap surfaces.

6. The tool of claim 2, wherein abrasive is secured to the flap surfaces and covered with a thin protective coating.

7. The tool of claim 2, wherein said spacer means is formed by bent tabs integral with said flaps.

8. The tool of claim 2, wherein said flaps are perforate.

9. The tool of claim 2, wherein said annular end plates are perforate and said elastomeric composition enters into such perforations to assist in joining the assembly together.

10. The method of manufacturing a rotary abrading tool which comprises affixing a quantity of uncured elastomeric composition to a plurality of sheet material flaps, assembling such flaps in a circular arrangement lying in radial planes parallel to the axis of rotation of such tool, enclosing such assembly in a mold, and heating to cure such elastomeric composition in elastomeric condition.

11. The method of claim 10, wherein a blowing compound is provided in such elastomeric composition effective on heating to form a multitude of small cavities in the same and through expansion cause such composition to flow and uniformly fill the spaces between such flaps.

12. The method of claim 10, wherein a blowing compound is provided in such elastomeric composition effective on heating to form a multitude of small cavities in the same and through expansion cause such composition to flow and uniformly fill the spaces between such flaps, and bonding an annular hub element to such assembly by adherence to such elastomeric composition.

13. A rotary abrading tool having a large number of sheet material flaps assembled in radial planes parallel to the axis of rotation of the tool, hub means engaging and mounting said flaps, and a resiliently deformable elastomeric composition interposed between and resiliently spacing apart certain of said flaps only with others of said flaps being directly contiguous.

14. The tool of claim 13, wherein said elastomeric material is elastomeric sponge material.

15. The tool of claim 13, wherein said elastomeric material extends nearly to the outer working edges of said flaps and is of a composition more easily erodable in use than said flaps so that such condition is automatically maintained.

16. The method of manufacturing a rotary abrading tool which comprises interposing wedge-shaped bodies of uncured elastomeric material containing a blowing agent between sheet material flaps assembled in a circular arrangement lying in radial planes parallel to the axis of rotation of such tool, the thicker ends of such wedge-shaped bodies being oriented toward the radially outer periphery of the tool, enclosing the resultant assembly in a mold and heating to soften such elastomeric composition and activate such blowing agent to form a multitude of small cavities therein effective through expansion to cause such elastomeric composition to flow and uniformly fill the spaces between such flaps, and to cure such elastomeric composition.

17. A rotary abrading tool having a large number of hard sheet metal flaps assembled in radial planes substantially parallel to the axis of rotation of the tool, said metal flaps comprising abrasive sheets having a sponge elastomeric layer bonded thereto with said sponge elastomeric layers being grooved generally radially of the tool to provide passages for outward flow of coolant fluid such as air.

18. A rotary abrading tool comprising a large number of metallic abrading elements having a Knoop hardness in excess of 600 assembled radially to the axis of rotation of the tool, central hub means engaging and mounting said elements, and a polyurethane resin sponge elastomeric composition bonding together while resiliently spacing apart adjacent metallic abrading elements thus both protecting and damping vibrations therein.

19. A rotary abrading tool comprising a large number of hard austenitic steel abrading elements assembled radially to the axis of rotation of the tool, central hub means engaging and mounting said elements, and a polyurethane resin sponge elastomeric composition bonding together while resiliently spacing apart adjacent steel abrading elements thus both protecting and damping vibrations therein.

20. A unitary polishing wheel adapted to be cooled in use by flow of a coolant therethrough, comprising a hollow center circular pack of sheet material flaps each having a dovetail shaped inner end portion, an abrasive surface on at least certain of said flaps, means forming central passages between adjacent inner end portions of said flaps to permit flow of a coolant such as air drawn into such hollow center of said pack and outwardly through such passages between said flaps by rotation of the wheel in use, and two annular sheet metal stampings fitting the respective inner dovetail corners of said pack of flaps and adhered thereto, said stampings being spaced apart to expose such coolant passages between said flaps, elastomeric material being interposed between and secured to alternate flaps thereof.

21. A unitary polishing wheel adapted to be cooled in use by flow of a coolant therethrough, comprising a hollow center circular pack of sheet material flaps each having a dovetail shaped inner end portion, an abrasive surface on at least certain of said flaps, means forming central passages between adjacent inner end portions of said flaps to permit flow of a coolant such as air drawn into such hollow center of said pack and outwardly through such passages between said flaps by rotation of the wheel in use, and two annular sheet metal stampings fitting the respective inner dovetail corners of said pack of flaps and adhered thereto, said stampings being spaced apart to expose such coolant passages between said flaps, elastomeric sponge material being interposed between and secured to alternate flaps thereof.

References Cited in the file of this patent

UNITED STATES PATENTS

| | | |
|---|---|---|
| 596,014 | Condon | Dec. 21, 1897 |
| 2,015,646 | Hillix | Sept. 24, 1935 |
| 2,268,403 | Kingman | Dec. 30, 1941 |
| 2,284,715 | Benner et al. | June 2, 1942 |
| 2,316,257 | Krastin | Apr. 13, 1943 |
| 2,328,998 | Radford | Sept. 7, 1943 |
| 2,334,572 | Melton et al. | Nov. 16, 1943 |
| 2,444,093 | Crumbling et al. | June 29, 1948 |
| 2,465,225 | Haren | Mar. 22, 1949 |
| 2,492,143 | Gipple et al. | Dec. 27, 1949 |
| 2,506,288 | Bahr | May 2, 1950 |
| 2,535,637 | Johnson | Dec. 26, 1950 |
| 2,650,158 | Eastman | Aug. 25, 1953 |
| 2,651,894 | Leggett | Sept. 15, 1953 |
| 2,720,064 | Klug | Oct. 11, 1955 |
| 2,740,239 | Ball et al. | Apr. 3, 1956 |
| 2,811,816 | Back | Nov. 5, 1957 |
| 2,842,902 | Miller et al. | July 15, 1958 |
| 2,913,857 | Reed et al. | Nov. 24, 1959 |